United States Patent [19]

Taguchi

[11] Patent Number: 5,172,357
[45] Date of Patent: Dec. 15, 1992

[54] PHASE-SYNCHRONOUS CONTROLLER FOR PRODUCTION OF REFERENCE CLOCK SIGNAL IN OPTICAL DISK DRIVE SYSTEM

[75] Inventor: Toyoki Taguchi, Yokohama, Japan

[73] Assignee: Kabushiki Kaisha Toshiba, Kawasaki, Japan

[21] Appl. No.: 589,642

[22] Filed: Sep. 28, 1990

[30] Foreign Application Priority Data

Sep. 29, 1989 [JP] Japan .................. 1-254898

[51] Int. Cl.$^5$ .............................................. G11B 7/00
[52] U.S. Cl. .................................... 369/48; 369/124; 360/36.1; 358/337; 331/25
[58] Field of Search ...................... 369/47, 48, 124, 32; 360/36.1, 36.2; 358/337, 338, 339, 342; 331/18, 25, 51

[56] References Cited

U.S. PATENT DOCUMENTS

| | | | |
|---|---|---|---|
| 4,347,484 | 8/1982 | Vandegraaf | 331/25 |
| 4,651,231 | 3/1987 | Douglas, Jr. | 358/337 |
| 4,688,003 | 8/1987 | Stromsworld | 331/25 |
| 4,768,103 | 8/1988 | Nakamura et al. | 360/36.1 |

OTHER PUBLICATIONS

A High Definition Muse VCR With Analog Segment Recording Method Takashi Furuhata et al., Jan. 31, 1986 pp. 107–115.

Clock Jitter in Sampled Servo Format Takashi Takeuchi et al. pp. 137–140.

Primary Examiner—Robert Weinhardt
Assistant Examiner—Muhammad Edun
Attorney, Agent, or Firm—Oblon, Spivak, McClelland, Maier & Neustadt

[57] ABSTRACT

A phase-lock control circuit suitable for an optical disk apparatus of a sample-servo format scheme includes an injection-synchronized control loop in addition to a normal phase-lock loop control loop. The phase-lock loop control loop includes a phase-comparator, a low-pass filter, a voltage-controlled oscillator, i.e., a VCO, a frequency-dividing counter, and a decoder. The phase-comparator detects a phase difference between a clock pit pulse signal and a feedback pulse signal supplied through the frequency-dividing counter and the decoder. The VCO is oscillated to compensate for the phase difference and generates a reference clock signal. A time-base filter and an injection pulse generator are provided for the VCO to constitute the injection-synchronized control loop, wherein at least one injection pulse having a pulse width substantially equal to the non-response period of the comparator is intermittently generated in response to the reference clock signal upon completion of a comparison operation by the comparator, and the injection pulse is supplied to the VCO. The VCO is of an injection-synchronized voltage-controlled type.

12 Claims, 10 Drawing Sheets

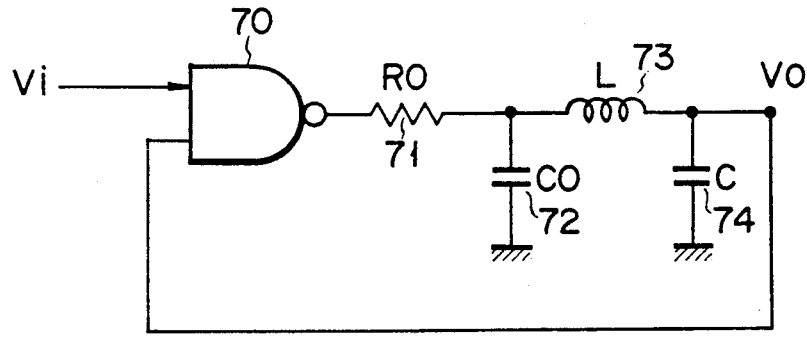
F I G. 5
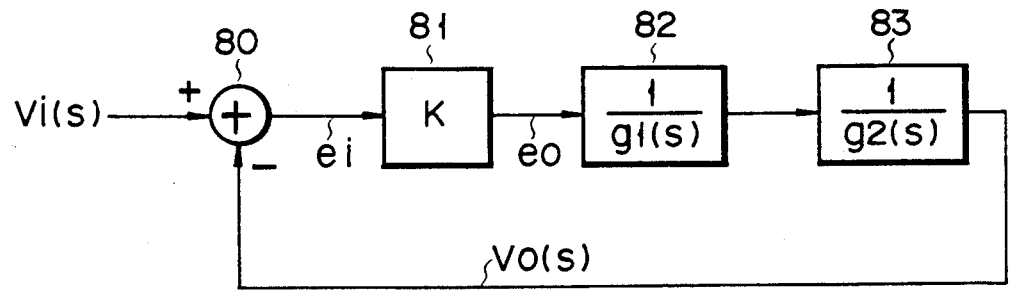
F I G. 6
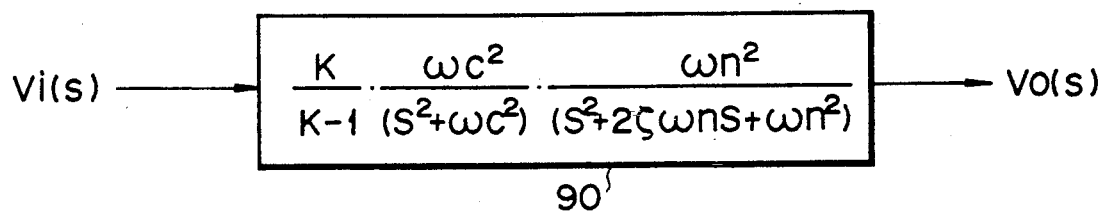
F I G. 7

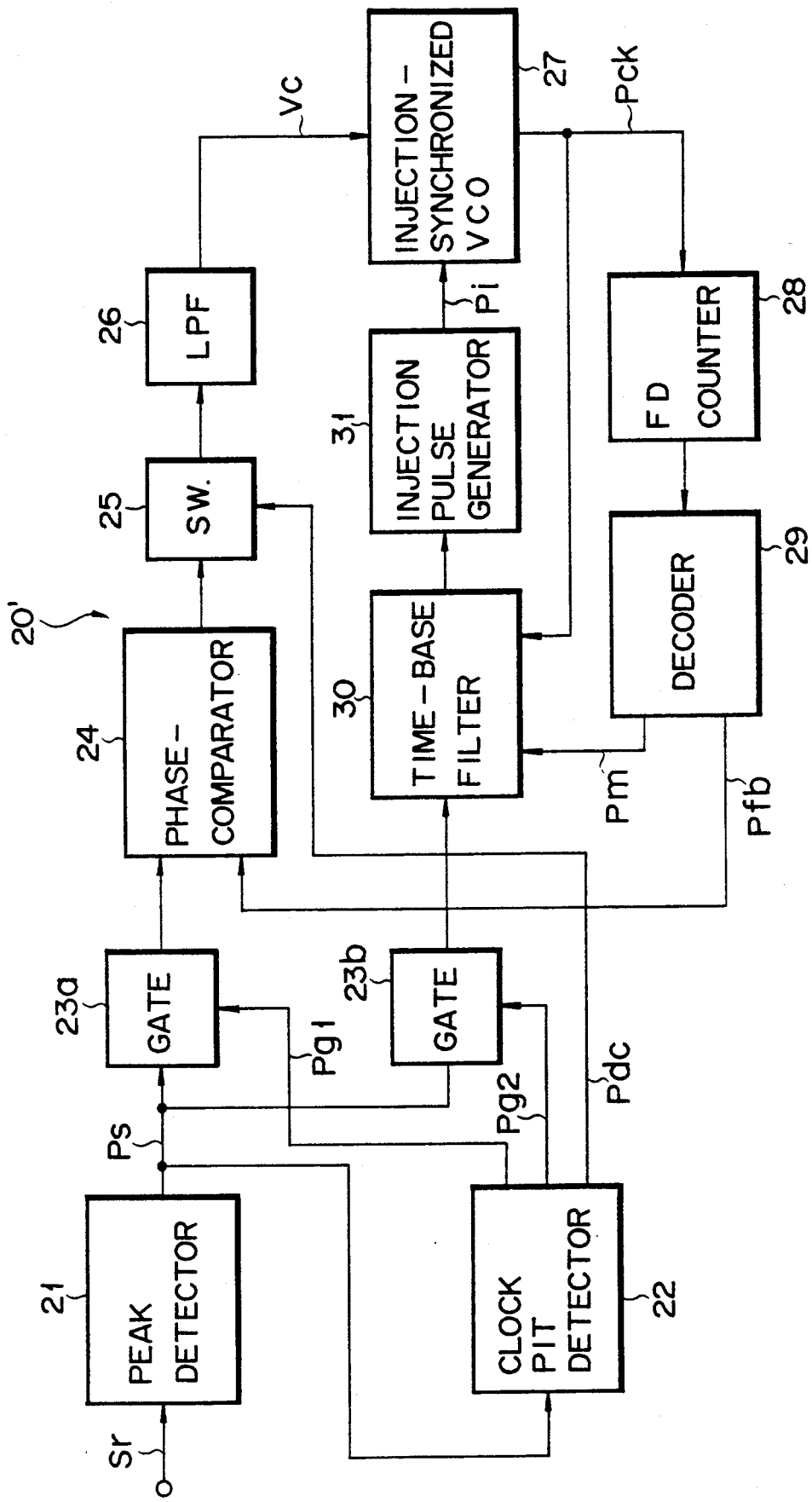
F I G. 13

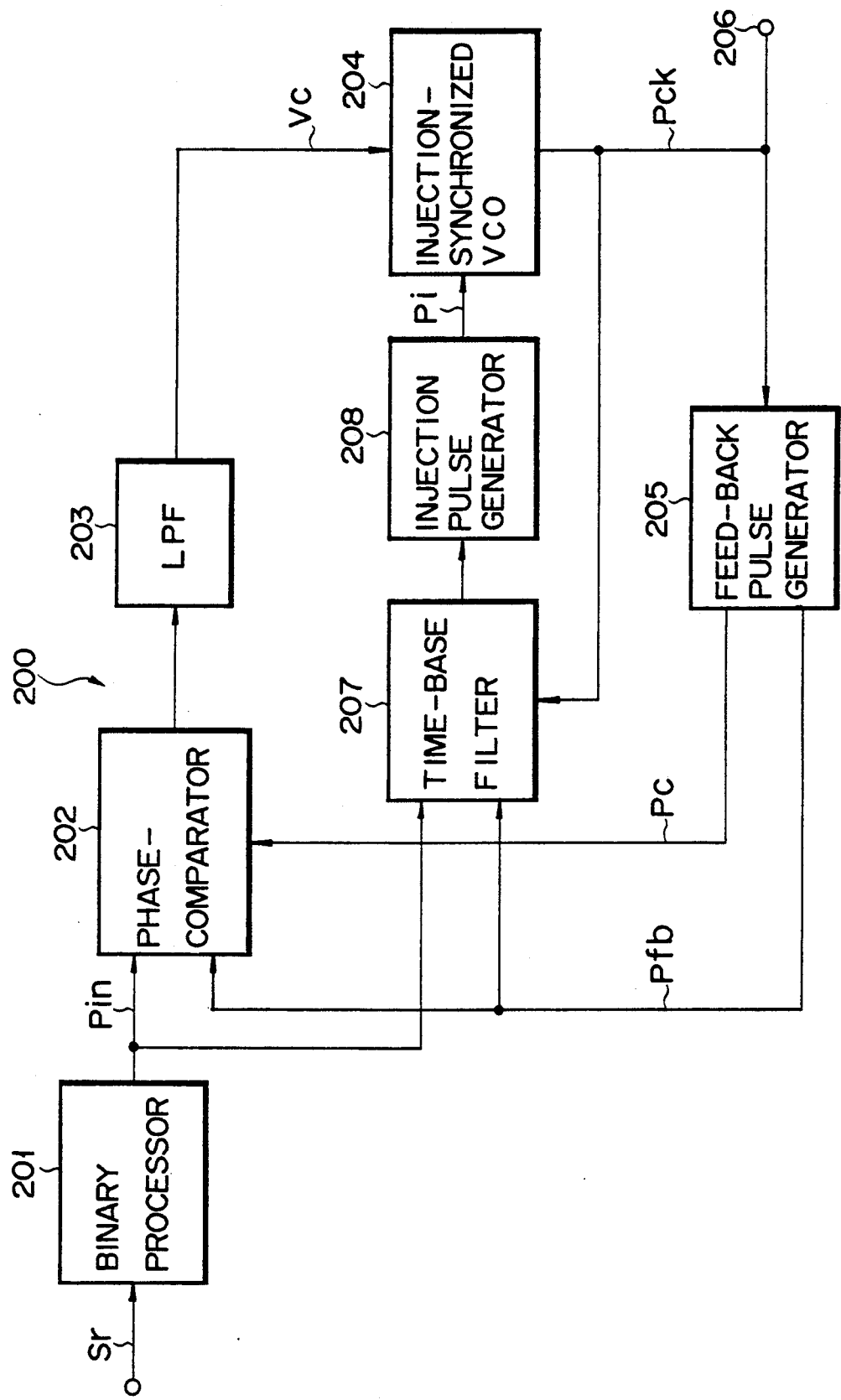
F I G. 15

PHASE-SYNCHRONOUS CONTROLLER FOR PRODUCTION OF REFERENCE CLOCK SIGNAL IN OPTICAL DISK DRIVE SYSTEM

BACKGROUND OF THE INVENTION

1. Field of the Invention

The present invention relates to a technique for generating a high-precision reference clock signal suitably applied to a data storage system using a rotatable disk-like storage medium and, more particularly, to a phase control circuit for a digital apparatus capable of high-density, high-speed data access. More specifically, the present invention relates to an optical disk drive system capable of high-speed data access, which is suitably used as an external memory unit of a highly-advanced computer.

2. Description of the Related Art

Of various types of data storage disk units, sample-servo scheme optical disk drive system attract a great deal of attention from engineers. This is because such optical disk apparatuses are firmly believed by the engineers to be much superior to the remaining types in a data storage capacity, operation reliability, and application range.

When such a sample-servo scheme optical disk apparatus is to be used as an external memory unit of a current, highly-advanced computer, an improvement in data processing performance of the computer demands a higher data accessing speed of the optical disk drive system while the manufacturing cost is minimized and excellent operation reliability is maintained.

Various technical subjects or obstacles lie in the process of increasing the data accessing speed of an optical disk drive system. A technique of extracting a high-precision reference clock signal is one of them. In general, a reference clock signal for data recording and reproduction is generated in the following manner. Clock pits included in servo byte areas of a rotating optical disk are read by scanning of a light beam spot. A reproduced clock pit pulse signal is supplied to a phase-lock loop control circuit to obtain an oscillation output from a voltage-controlled oscillator. A reference signal generation circuit arrangement for a sample-servo scheme optical disk apparatus is disclosed in, e.g., ISOM '87 Technical Digest "CLOCK JITTER IN SAMPLED SERVO FORMAT" Takashi Takeuchi et al., 1987, pp. 137-140.

If the rotational speed of an optical disk itself is increased in order to increase the data accessing speed of an optical disk drive system, high-frequency jitter components are generated in the resultant reproduced reference clock signal due to an increase in mechanical resonant vibration produced in an optical disk driving mechanism portion. Residual high-frequency jitter components degrade the precision of a reference clock signal and greatly degrade the data accessing performance.

In order to increase the precision of a reference clock signal in a high-speed optical disk drive system, the sampling frequency of a phase-lock loop control circuit may be increased to jack up the reproduction clock rate of an optical disk. If a high sampling frequency is set, the operation range of the phase-lock loop control circuit which is free from high-frequency jitter can be expanded. With an increase in reproduction clock rate, therefore, reproduction of a high-precision reference clock signal can be expected. With such an arrangement, however, the area occupied by servo byte areas including clock pits is increased on the optical disk which is sample-servo formatted in a limited surface area. With this increase in area, effective data storage areas are relatively reduced. In other words, the format efficiency of the optical disk is decreased. This impairs one of the merits of an optical disk, i.e., a large recording capacity.

In order to increase the precision of a reference clock signal in a high-speed optical disk drive system, the mechanical rigidity and process precision of an optical disk driving mechanism portion may be improved to suppress or eliminate the occurrence of mechanical resonance associated with high-speed rotation of an optical disk, which is a direct cause of high-frequency jitter components. Such an improvement in a mechanical system, however, is not welcomed by the manufacturers of optical disk drive system for the following reasons. The above-described mechanical means for solving the problem complicates the mechanical design and the manufacturing process and increases the manufacturing cost.

SUMMARY OF THE INVENTION

It is, therefore, an object of the present invention to provide a new and improved signal phase processing technique for generating a high-precision reference clock signal.

It is another object of the present invention to provide a new and improved phase-lock loop circuit suitable for a highly advanced optical disk drive system and capable of generating a high-accuracy reference clock signal without complicating the circuit arrangement.

It is still another object of the present invention to provide a new and improved sample-servo scheme optical disk drive system capable of high-speed data access in response to a high-accuracy clock signal free from high-frequency jitter components.

In accordance with the above objects, the present invention is addressed to a specific phase-lock control device which generates a reference clock signal having a predetermined frequency by using clock information reproduced from a data storage medium. A signal extracting section receives an electrical reproduction output signal from the data storage medium and generates an electrical pulse signal (Pin) reflecting the clock information. An electrical oscillator is variably oscillated to generate an electrical oscillation pulse signal serving as the reference clock signal. A comparator is connected to the signal extracting section and the oscillator so as to detect a phase difference between the pulse signal and the oscillation pulse signal and to generate an electrical comparison result signal in response to which the oscillator is variably oscillated. An injection-synchronized section receives the pulse signal and is responsive to the oscillation pulse signal. The injection-lock section intermittently injects at least one injection pulse component having a selected pulse width into the oscillator after phase comparison is performed by the comparator. The oscillator includes an injection-synchronized voltage-controlled oscillator which is responsive to the injection pulse component and adjusts the phase of the oscillation pulse signal by advancing/delaying it.

The invention and its objects and advantages will become more apparent from a detailed description of the preferred embodiments presented below.

BRIEF DESCRIPTION OF THE DRAWINGS

In the detailed description of preferred embodiments of the present invention presented below, reference is made to the accompanying drawings in which:

FIG. 5 is an equivalent circuit diagram of an injection-synchronized voltage-controlled oscillator;

FIG. 6 is an equivalent block diagram of the circuit in FIG. 5;

FIG. 7 is a block diagram obtained by transforming the block diagram in FIG. 5;

FIG. 13 is a schematic diagram showing an overall arrangement of a reference clock signal generation circuit for an optical disk apparatus according to another embodiment of the present invention;

FIG. 15 is a schematic diagram showing an overall arrangement of a reference clock signal generation circuit for an optical disk apparatus according to still another embodiment of the present invention.

DETAILED DESCRIPTION OF THE PREFERRED EMBODIMENTS

Figure 1:
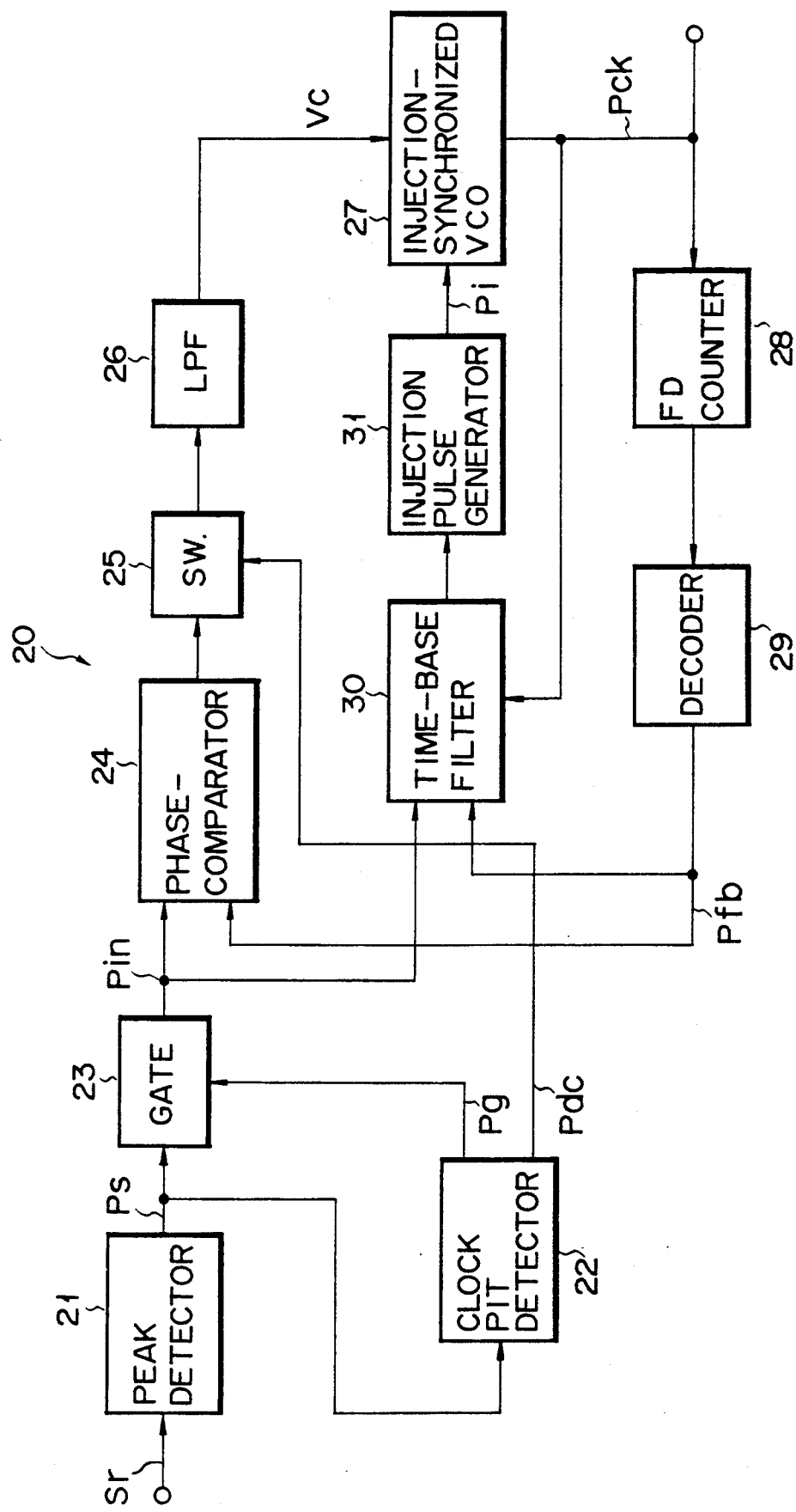
FIG. 1 is a schematic diagram showing an overall arrangement of a reference clock signal generation circuit for an optical disk apparatus according to an embodiment of the present.

Referring to FIG. 1, a reference clock signal generation circuit for an optical disk apparatus according to a preferred embodiment of the present invention is generally designated by reference numeral 20. Typically, this optical disk is sample-servo formatted, which has control information areas called "servo bytes" spirally arranged at predetermined intervals on one disk surface. Each servo byte area has two control pits arranged on both sides of a corresponding spiral track center line, and a clock pit in a known manner. The remaining divided areas of the spiral track are assigned to data storage. These areas are called "data areas". A sample-servo format scheme of an optical disk itself is well known to a person skilled in the art, and is disclosed in, e.g., ISOM '87 Technical Digest "CLOCK JITTER IN SAMPLED SERVO FORMAT" Takashi Takeuchi et al., 1987, pp. 137-140.

A peak detector 21 is arranged, to which a reproduction output signal Sr from a presently available sample-servo scheme optical disk (not shown) is supplied. The reproduction output signal Sr has peak waveform components in correspondence with control pits and a clock pit in each servo byte area of a track, of the optical disk, onto which a reproduction laser beam is being focused. These peak waveform components are generally called "pit signals". The peak detector 21 performs binary processing of the signal Sr to generate positive pulse signal components Ps which are generated in synchronism with the above-mentioned pit signals. The pulse signal components are required for accurate timing control.

The binary output signal from the peak detector 21, which includes binary pulses, is supplied to a clock pit detector 22 and a gate 23. The clock pit detector 22 generates extraction pulses Pg and error correction pulses Pdc on the basis of a string of input binary pulses. The extraction pulses Pg are used to extract normal clock pulses. The extraction pulses Pg are supplied to the gate 23 connected between the peak detector 21 and a phase-comparator 24. The error correction pulses Pdc are supplied to the phase-comparator 24 and are used to remove detection error noise components generated therein.

The gate 23 extracts the rise timing of a normal clock pit pulse. An output signal from the gate 23, which represents the extracted pulse rise timing, is supplied to one input of the phase-comparator 24. The phase-comparator 24 constitutes a feed-back closed loop circuit together with a switch 25, a low-pass filter 26, a voltage-controlled oscillator 27, a frequency-diving counter 28, and a decoder 29, as shown in FIG. 1. This closed loop circuit is a phase-lock loop abbreviated as a "PLL". The decoder 29 generates a feed-back clock signal Pfb, which is supplied to the other input of the phase-comparator 24. The phase-comparator 24 compares the phases of input signals received by the first and second inputs so as to detect a phase difference therebetween.

An output signal of the phase-comparator 24 is sent to the low-pass filter 26 through the switch 25 and is subjected to filter processing. A negative output signal of the low-pass filter 26 is supplied as a control voltage signal V to the voltage-controlled oscillator (to be simply referred to as a "VCO" hereinafter) 27. The VCO 27 generates a reference clock signal Pck in response to the control signal Vc. The reference clock signal Pck appears at the output terminal of the unit 20 and is simultaneously supplied to the frequency-dividing counter 28. The frequency-dividing counter 28 1/N-divides (N=270) the frequency of the reference clock signal Pck to generate a 1/N-divided clock signal, which is supplied to the decoder 29. The decoder 29 generates the feed-back clock signal Pfb in response to a state transition of the frequency-dividing counter 28. The feed-back clock signal Pfb is, therefore, a pulse signal having a frequency 1/N that of the reference clock signal Pck.

With such a PLL configuration, the reference clock signal Pck generated by the VCO 27 is accurately phase-locked with clock pit pulses from the optical disk.

In addition, the frequency of the signal Pck can be set to be N times the repeating frequency of clock pit pulses, i.e., a sampling frequency. Therefore, the reference clock signal Pck serves as a recording/reproduction reference clock signal of a rotating optical disk, or as a reference clock signal for detection of a control signal.

Note that in this embodiment, in addition to the above-described PLL, the unit 20 comprises an injection-locked loop including a time-base filter 30 for performing time-domain filtering and an injection pulse generator 31. More specifically, the VCO 27 is constituted by an injection-locked VCO, which constitutes a feed forward injection-synchronized loop together with the time-base filter (to be referred to as a time-domain filter hereinafter) 30 and the injection pulse generator 31.

The first input of the time-domain filter 30 is supplied with a clock pit pulse signal Pin extracted by the gate 23. The output signal of the decoder 29, i.e., the feed-back clock signal Pfb, is sent to the phase-comparator 24 and is simultaneously supplied to the second input of the filter 30. The filter 30 generates a window pulse signal by referring to a timing between the clock signal Pck and the feed-back clock signal Pfb. The window signal will be described in more detail later. By using the window pulse signal, the filter 30 performs time-domain filtering effective for injection synchronization, i.e., extraction of only clock pit pulses phase-locked with the feed-back clock signal Pfb.

The injection pulse generator 31 generates an injection pulse signal Pi on the basis of the clock pit pulse signal subjected to time-domain filtering. When the injection pulse Pi is injected into the injection-synchronized VCO 27, the phase of the reference clock signal Pck is properly controlled. In this case, unlike a normal VCO arrangement, the VCO oscillation output is phase-controlled not only by the control voltage signal Vc but also by the injection pulse signal Pi.

Figure 2:
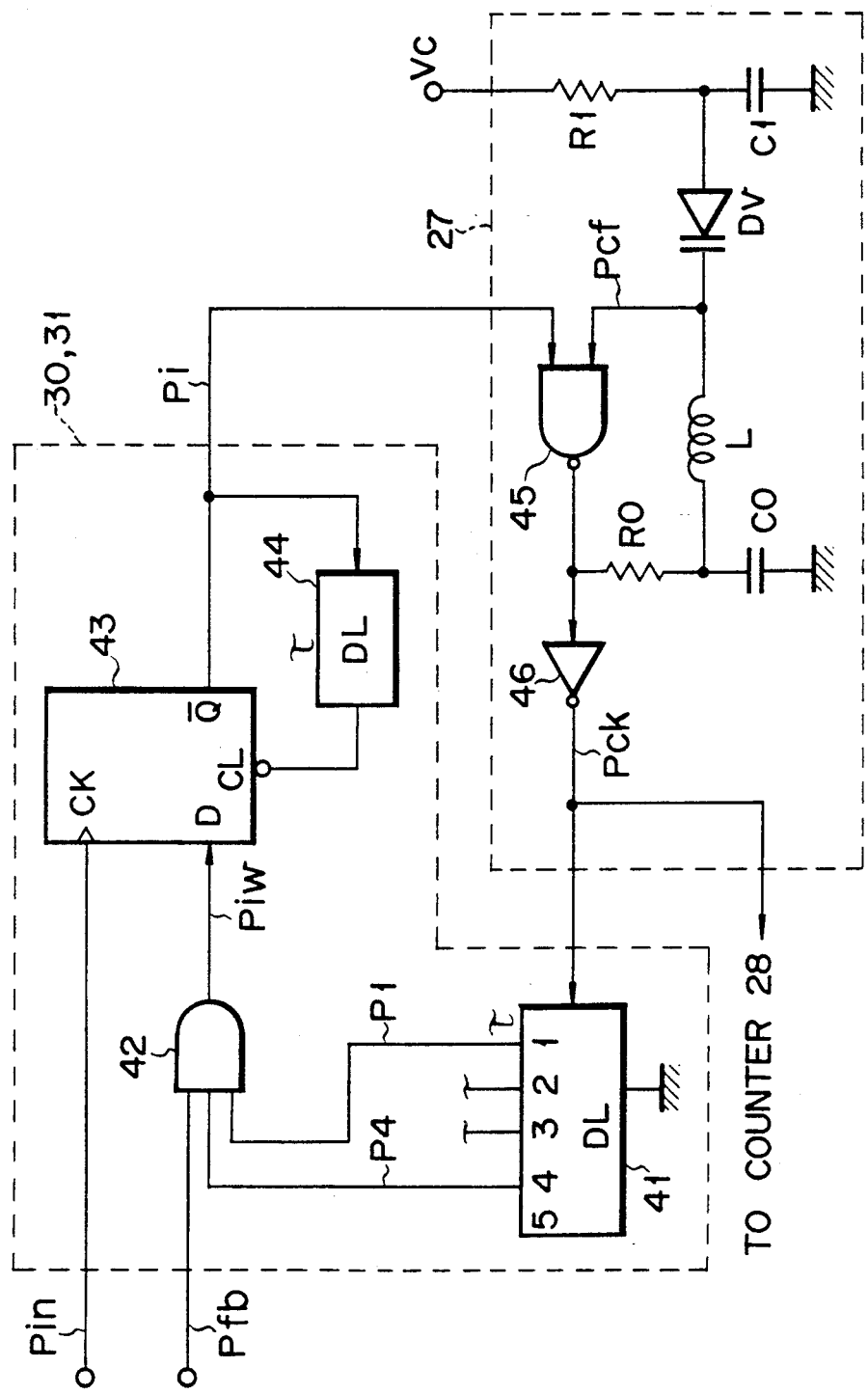
FIG. 2 is a diagram showing a detailed internal arrangement of a main part of the reference clock signal generation circuit.
Figure 3:
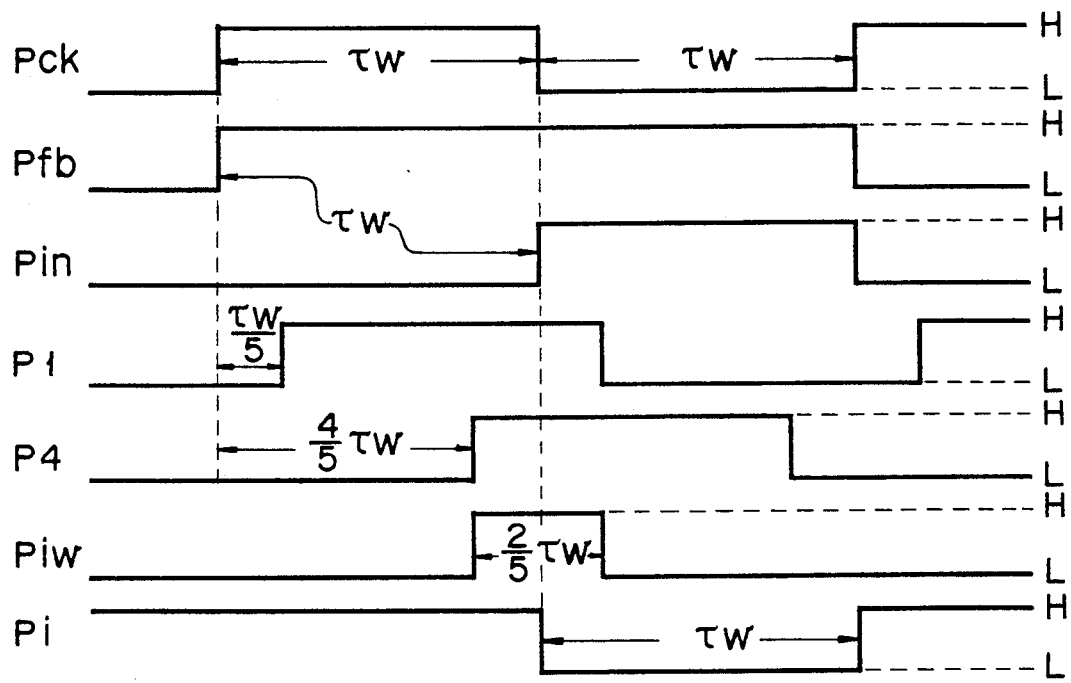
FIG. 3 is a timing chart showing main electrical signals generated at the respective main components of the circuit portion in FIG. 2 on the same time scale.

FIG. 2 shows detailed internal arrangements of the components 27, 30, and 31 constituting the additional injection-synchronized loop. Referring to FIG. 2, a circuit portion corresponding to the time-domain filter 30 and the injection pulse generator 31 is indicated by a dotted block denoted by reference numerals 30 and 31. The time-domain filter 30 and the injection pulse generator 31 include a tapped delay circuit 41, a 3-input AND gate 42, a D-type flip-flop 43, and a delay circuit 44. The injection-locked VCO 27 includes a 2-input NAND gate 45 and an inverter 46. Resistors R0 and R1, capacitors C0 and C1 a varactor diode Dv, and an inductor (coil) L, which are connected as shown in FIG. 2, are provided for the above-mentioned components. The resistor R0, the capacitor C0, the varactor diode Dv, and the inductor L constitute a load resonator to be connected to the NAND gate 45.

The clock pit pulse signal Pin is supplied to a clock input CK of the D-type flip-flop 43. When data input to an input D of the D-type flip-flop 43 is at "H" level, the flip-flop 43 sets its inverted output $\overline{Q}$ at "L" level in synchronism with the rise timing of the clock pit pulse signal Pin. When the "L"-level inverted output $\overline{Q}$ is input to a clear terminal CL of the D-type flip-flop 43 through the delay circuit 44, the inverted output $\overline{Q}$ is restored to "H" level. As a result, the flip-flop 43 intermittently generates negative pulse components Pi each having a pulse width equal to a delay amount τw of the delay circuit 44. In other words, each intermittent pulse component Pi has a pulse width substantially equal to the non-response period of oscillation of the injection-synchronized VCO 27.

The intermittent pulse signal Pi is supplied as an injection pulse signal to the first input of the 2-input NAND gate 45. The delay amount τw of the delay circuit 44 is typically set to be ½ the period of the reference clock signal Pck. An output signal from the NAND gate 45 is fed back to its second input through the above-mentioned load resonator associated with the gate 45.

In this case, the circuit portion constituted by the NAND gate 45, the resistor R0, the capacitor C0, the inductor L, and the varactor diode Dv oscillates while the injection pulse signal is at "H" level. This circuit portion constitutes a gated oscillator known to a person skilled in the art, wherein its oscillation phase is controlled by changing the injection timing of the injection pulse signal Pi. This is directly associated with the gist of the present invention and hence is important. This will be described in detail later.

The negative control voltage Vc generated by the low-pass filter 26 in FIG. 1 is supplied to the anode of the varactor diode Dv through a high-frequency noise removing low-pass filter circuit constituted by the injection-synchronized VCO 27, the resistor R1, and the capacitor C1. Therefore, the injection-synchronized VCO operates as an injection-synchronized voltage-controlled oscillator.

An oscillation output of the NAND gate 45 is processed as an output from the injection-synchronized VCO 27 through the inverter 46. This oscillation output is supplied to the tapped delay circuit 41. The total delay amount of the tapped delay circuit 41 is set to be equal to the delay amount τw. The delay amount τw between the respective taps is set to be, e.g., τw/5. A first tap output P1 and a fifth tap output P5 are supplied to the second input of the AND gate 42. Another input of the AND gate 42 is being supplied with the feed-back clock signal Pfb output from the decoder 29 of the PLL in FIG. 1. The AND gate 42 generates the window pulse signal Piw for extracting the rise timing of the clock pit pulse signal Pin. The window pulse signal Piw is supplied to the data input of the D-type flip-flop 43. If the phase of the feed-back clock signal Pfb coincides with that of the window pulse $$C(s) = \frac{Vo(s)}{Vi(s)} \tag{5}$$

$$= \frac{K}{K-1} \cdot \frac{\omega c^2}{(s^2 + \omega c^2)} \cdot \frac{\omega n^2}{(s^2 + 2\zeta\omega ns + \omega n^2)}$$

The third term of ωn represents the transient response of oscillation. If ωn is the natural frequency and ζ is a damping coefficient, ωn and ζ are respectively represented as follows:

$$\omega n^2 = \frac{n}{m(m + n + 1)} \cdot \omega c^2 \tag{6}$$

$$\zeta = \frac{(m + 1)m + 1}{2am + n} \tag{7}$$

If ωc=γωn, ζ=1, and K/(K+1)=1, a step response of the oscillation output Vo is obtained by multiplying equation (5) by 1/s and performing reverse Laplace transformation thereof as follows:

$$V_o(t) = 1 - \frac{1}{\gamma^2 + 1} \sin(\omega_c t + \phi) - \left\{ \frac{\gamma^2 \omega_n t}{(n^2 + 1)} - \frac{(r^2 + 3)}{(n^2 + 1)\omega n^4} \right\} \exp(-\omega_n t) \quad (8)$$

$$\phi = \tan^{-1}\{(\gamma - 1)/2\}$$

It is apparent from this equation that phase control by means of injection operation can be properly performed in consideration of the phase of a sine wave of the second term. Assume that an injection input Vi(t) is represented as a unit step function on the basis of the above-described injection conditions. In this case, if $\psi$ is the correction term of an injection phase and $\theta e$ is the phase difference during injection, the injection input is given by the following equations in a case of an advanced phase:

$$Vi(t) = u\{(\psi + \theta e)/\omega c - t\} + u\{t + (\psi - \pi)/\omega c\} \quad (9)$$

time-domain filtering, an erroneous operation of the injection-synchronized PLL which is caused by a defective clock pulse can be reliably prevented. If the rise timings of the oscillation feed-back input signal Pcf (i.e., the reference clock signal Pck) and of the injection pulse signal Pi coincide with each other, oscillation phases are not influenced at all.

Figures 4A, 4B, 4C:
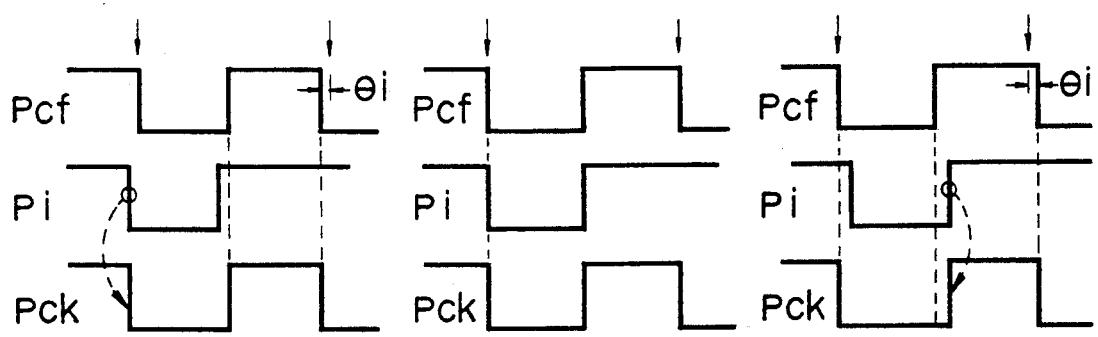
FIGS. 4A to 4C are timing charts respectively showing relationships between the phases of main signals in different cases of injection control operations.

The principle of phase control by means of the injection-synchronized loop will be described below with reference to the timing charts shown in FIGS. 4A to 4C. FIG. 4A shows a case wherein the phase of the clock pit pulse Pin is advanced from that of the feed-back clock Pfb. In this case, the reference clock Pck falls at the fall timing of the injection pulse Pi. Owing to a delay of the above-mentioned load resonator, the oscillation feed-back input Pcf is not changed at this timing but its phase is advanced by $\theta i$ at the next fall timing. FIG. 4B shows a case wherein the feed-back clock Pfb and the clock pit pulse Pin have the same phase. In this case, as described above, the phase of the reference clock Pck is not influenced. FIG. 4C shows a case wherein the phase of the clock pit pulse Pin is delayed from that of the feed-back clock Pfb. In this case, contrary to the case shown in FIG. 4A, the reference clock Pck is influenced immediately at the rise timing of the injection pulse Pi so as to be delayed by $\theta i$.

As described above, the conditions of the injection pulse Pi, for controlling the phase of the reference clock Pck by means of the injection-synchronized loop are to be set such that the average fall timing of the injection pulse Pi coincides with the fall timing of oscillation feed-back input Pcf, and its pulse width is equal to or slightly smaller than a pulse width, during an L-level interval, of the period of the oscillation feed-back input Pcf.

The reasons why phase control of the reference clock Pck can be stably performed on the basis of the above-described principle of injection synchronization will be analytically described below.

Each parameter will be defined first with reference to FIG. 5 showing an equivalent circuit of the injection-synchronized VCO 27 in FIG. 2. Assume that the input impedance of each input of a NAND gate 70 is infinite; the output impedance, zero; the gain, K; and the delay amount between an input and an output, $\tau d$. The constants of the load resonator are set such that the value of a resistor 71 is Ro as a value including the output resistance of the NAND gate; the value of a capacitor 72, Co; the value of an inductor 73, L; the value of a capacitor 74, C as a value obtained by adding the input capacitance of the NAND gate 70 to the capacitance of the varactor diode. In addition, assume that the input injection pulse Pi and the oscillation feed-back input Pcf are respectively represented by Vi(t) and Vo(t). In this case, in order to clarify the relationships between the respective constants, assume that while time constant $\tau c^2 = LC$ is set as a reference, delay amount $\tau d = \alpha \tau c$, time constant $Ro \cdot Co = \alpha m \cdot \tau c$, and time constant $Ro \cdot C = \alpha n \cdot \tau c$.

FIG. 6 is an equivalent block diagram of the circuit in FIG. 5. The NAND gate 70 can be equivalently regarded as an adder having a negative gain and hence is approximated by an addition point 80, a transfer element 81 (gain K), and a transfer element 82 (1st-order delay element of the delay amount $\alpha \tau c$) so as to be represented by $G1(s) = \alpha \tau c + 1$. A transfer element 83 representing a load resonator is given by the following equation (1):

$$G2(s) = \alpha m \tau c^3 s^3 + \tau c^2 s^2 + \alpha(m+n)\tau cs + 1 \quad (1)$$

If an input and an output to and from the transfer element 81 are respectively represented by ei(s) and eo(s), and an input to the addition point 80 is represented by Vi(s) = 0 in order to obtain oscillation frequency and gain conditions, the following equation (2) is given:

$$\begin{aligned} K &= eo(s)/ei(s) = G1(s)G2(s) \\ &= \alpha^2 m \tau c^4 S^4 + \alpha(m+1) \cdot \tau c^3 s^3 + \alpha^2(m+n)\tau c^2 s^2 + \\ &\quad \alpha(m+n+1)\tau cs + 1 \end{aligned} \quad (2)$$

If oscillation frequency conditions (s=j$\omega$; imaginary part=0) are applied to equation (2), an oscillation frequency $\omega c$ is given by:

$$\begin{aligned} wc^2 &= \frac{(m+n+1)}{(m+1)\tau c^2} \\ &= \frac{Ro(Zo + C) + \tau d}{LC(RoCo + \tau d)} \end{aligned} \quad (3)$$

If a CMOS-IC is used for the NAND gate 70, it normally has a gain of 60 dB or more. However, when such oscillation, i.e., a limit cycle occurs, a true loop gain must be obtained from the oscillation frequency conditions. This can be obtained by substituting equation (3) into equation (2) and is given by $$K = \frac{\alpha^2 n(m+n+1)}{(m+1)^2} - 1 \quad (4)$$

That oscillation occurs from the above-described oscillation frequency and gain conditions is equivalent to that a conjugate complex root is newly generated. The block diagram of FIG. 6 can be represented by a transfer element 90 shown in FIG. 7. This element is represented as a closed loop function as follows:

$$\begin{aligned} C(s) &= \frac{Vo(s)}{Vi(s)} \\ &= \frac{K}{K-1} \cdot \frac{\omega c^2}{(s^2 + \omega c^2)} \cdot \frac{\omega n^2}{(s^2 + 2\zeta \omega ns + \omega n^2)} \end{aligned} \quad (5)$$

The third term of $\omega n$ represents the transient response of oscillation. If $\omega n$ is the natural frequency and $\zeta$ is a damping coefficient, $\omega n$ and $\zeta$ are respectively represented as follows:

$$\omega n^2 = \frac{n}{m(m+n+1)} \cdot \omega c^2 \qquad (6)$$

$$\zeta = \frac{(m+1)m+1}{2am+n} \qquad (7)$$

If $\omega c = \gamma \omega n$, $\zeta = 1$, and $K/(K+1)=1$, a step response of the oscillation output Vo is obtained by multiplying equation (5) by 1/s and performing reverse Laplace transformation thereof as follows:

$$V_o(t) = 1 - \frac{1}{\gamma^2 + 1} \sin(\omega c t + \phi) - \left( \frac{\gamma^2 \omega n t}{(n^2+1)} - \frac{(r^2+3)}{(n^2+1)\omega n^4} \right) \exp(-\omega n t) \qquad (8)$$

$$\phi = \tan^{-1}\{(\gamma - 1)/2\}$$

It is apparent from this equation that phase control by means of injection operation can be properly performed in consideration of the phase of a sine wave of the second term. Assume that an injection input Vi(t) is represented as a unit step function on the basis of the above-described injection conditions. In this case, if $\psi$ is the correction term of an injection phase and $\theta e$ is the phase difference during injection, the injection input is given by the following equations in a case of an advanced phase:

$$V_i(t) = u\{(\psi + \theta e)/\omega c - t\} + u\{t + (\psi - \pi)/\omega c\} \qquad (9)$$

In a case of a delayed phase, $$V_i(t) = u(\psi/\omega c - t) + u\{t + (\psi - \theta e)/\omega c \qquad (10)$$

Assume that this injection input is subjected to Laplace transformation and is applied to equation (5), and a stationary solution is obtained upon reverse Laplace transformation for $\omega c = \omega n$. As is apparent from equation (10), in a case of an advanced phase, the injection input is given by $$V_o(t) = \sin(\omega c t + \phi + \psi + \theta e) - \sin(\omega c t + \phi + \psi - \pi) \qquad (11)$$

If equation (10) is rewritten for $-\phi = \psi$ and $\theta e/2 < \pi/2$, then $$V_o(t) = 2\cos(\theta e/2) \cdot \sin(\omega c t + \theta e/2) \qquad (12)$$

In a case of a delayed phase, $$V_o(t) = 2\cos(\theta e/2) \cdot \sin(\omega c t - \theta e/2) \qquad (13)$$

If only phases are considered, it is apparent that phase shift control is performed by an injection operation in a direction to reduce a phase difference, and the control amount is reduced to $\frac{1}{2}$. However, if $\omega c << \omega n$ or $\omega c >> \omega n$, the control amount is greatly changed due to the influences of the nonlinear characteristics of the NAND gate 70 and the transient term.

With regard to the recording/reproduction reference clock Pck, phases after the clock pit pulse Pin are important. The natural angular frequency $\omega n$ of the transient term must be set to be equal to $\omega c$, and the damping coefficient $\zeta$ must be set to be close to unity.

Figure 8:
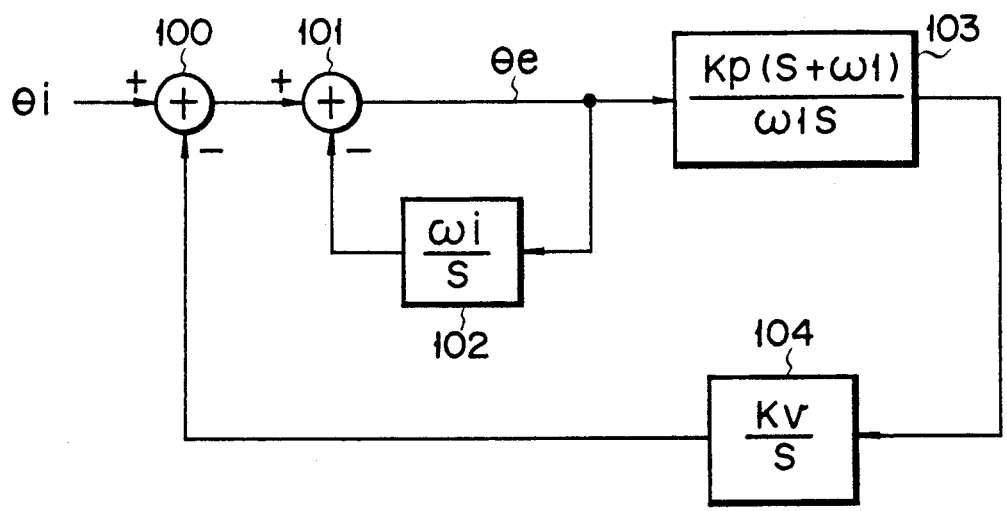
FIG. 8 is an equivalent block diagram of a circuit obtained by combining a phase-lock loop and an injection-synchronized loop on the basis of the principle of the present invention.

Effects obtained when the injection-synchronized loop and the PLL are used together will be described below on the basis of analysis results of the abovedescribed injection-synchronized oscillator. FIG. 8 is an equivalent block diagram of a circuit to be realized when the injection-synchronized loop and the PLL ar used together. For the sake of illustrative convenience, a term of wasted time caused by sampling will be omitted. An input $\theta i$ is the phase of the clock pulse Pin; and an output $\theta e$ from addition point 101, an observed phase difference, from which residual jitter is calculated. Although addition points 100 and 101 are located at the same point, they are assumed to be separated from each other for descriptive convenience.

As described above, injection synchronization is to control the output phase of the injection-synchronized oscillator to be $\frac{1}{2}$ the phase difference by an injection operation in a stepwise manner. This operation is equivalent to negative feed-back of the phase difference $\theta e$ to the addition point 101 through a transfer element 102, as shown in FIG. 8. The circuit for this operation is called the injection-synchronized loop. The transfer element 102 is represented by a transfer function $\omega\iota/s$. If a control amount is represented by an injection efficiency $\eta(=\frac{1}{2})$; and the sampling frequency, by fs, an injection gain $\omega i$ is calculated from the response characteristics of the loop as follows:

$$\omega i = -fs \cdot \ln(1-\eta) \qquad (14)$$

The PLL is represented by a loop for negatively feeding back the phase difference $\theta e$ to the addition point 100 through a transfer element 103 representing a phase-comparator and a loop filter, and a transfer element 104 representing a VCO. A transfer function F(s) of the transfer element 103 is given by the following equation, provided that a conversion gain at which the phase difference is converted into a voltage is represented by Kp, and the phase correction zero point of the loop is represented by $\omega_1$:

$$F(S) = \frac{Kp(s + \omega_1)}{\omega_1 s} \qquad (15)$$

A transfer function H(s) of the transfer element 104 is given by the following equation, provided that a conversion gain at which the voltage is converted into a frequency is represented by Kv, and the frequency is converted into a phase:

$$H(s) = Kv/s \qquad (16)$$

Figure 9:
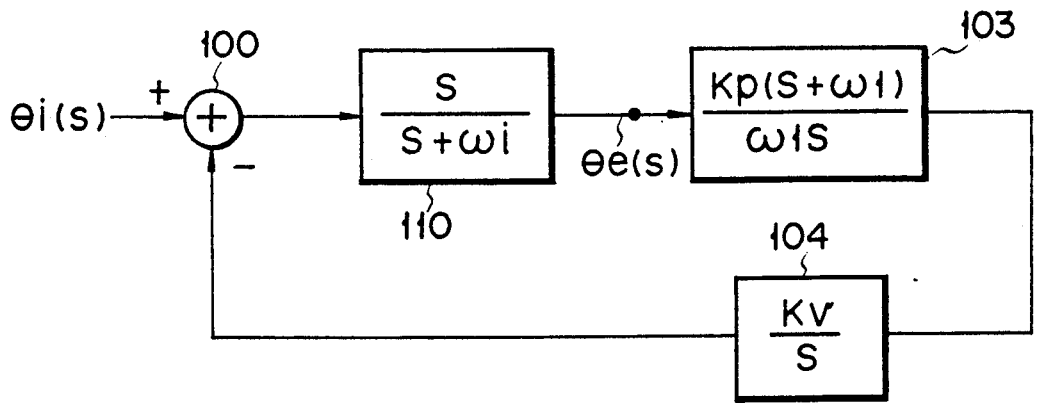
FIG. 9 is an equivalent block diagram of the circuit in FIG. 8.

FIG. 9 is a block diagram showing a circuit obtained by converting the above-mentioned injection-synchronized loop. A transfer function I(s) of a transfer element 110 representing the injection-synchronized loop is represented by:

$$I(s) = s/(s + \omega i) \qquad (17)$$

In this case, the injection-synchronized loop is represented by a 1st-order high-pass filter having the injection gain angular frequency $\omega i$ as a pole. If the injection efficiency $\eta = \frac{1}{2}$, the injection gain angular frequency $\omega i$ is given by $\omega i = 0.69 \times fs$ according to equation (14). In addition, the natural frequency of the PLL is $0.31 \times fs$ according to the above-described conditions. This indicates that the injection-synchronized loop serves as a differential operator for performing only phase control within the control band of the PLL, and the phase-comparator serves to detect a frequency.

In order to equivalently detect a frequency by using the phase-comparator, the interval between the injection timing and the phase comparison timing must be increased. As an injection condition for this purpose, an injection operation must be performed upon completion of phase comparison, as described above. When the load of the phase-comparator in a low-frequency region is reduced, the dynamic range is increased. Therefore, even if the phase comparison characteristics include nonlinearity, the influence of the nonlinearity can be greatly reduced.

Figure 10:
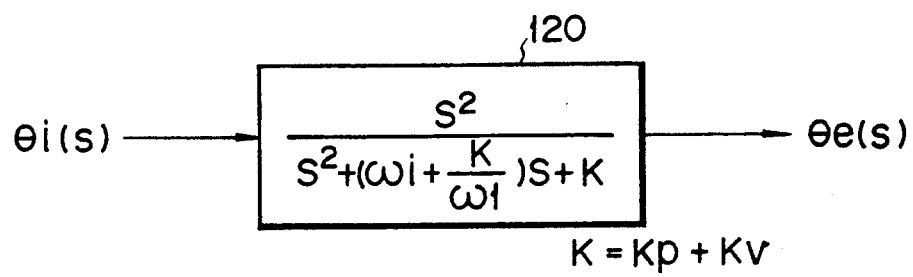
FIG. 10 is an equivalent block diagram of the circuit in FIG. 9.

If the conversion shown in FIG. 9 is advanced to evaluate the jitter suppression characteristics, the corresponding circuit can be represented by a transfer element 100 shown in FIG. 10. If a loop gain $K = Kp \cdot Kv$, the transfer function is given by equation (18) as follows:

$$\frac{\theta e(s)}{\theta i(s)} = \frac{s^2}{s^2 + (\omega i + K/\omega i)s + K} \quad (18)$$

A damping coefficient is obtained from this equation as follows:

$$\zeta = (\omega i/\omega n + \omega n/\omega_1)/2$$

$$\text{for } \omega n^2 = k \quad (19)$$

Therefore, it is apparent that damping degradation due to the waste of time, which poses a problem in a sampling system, can be greatly improved.

Figure 11:
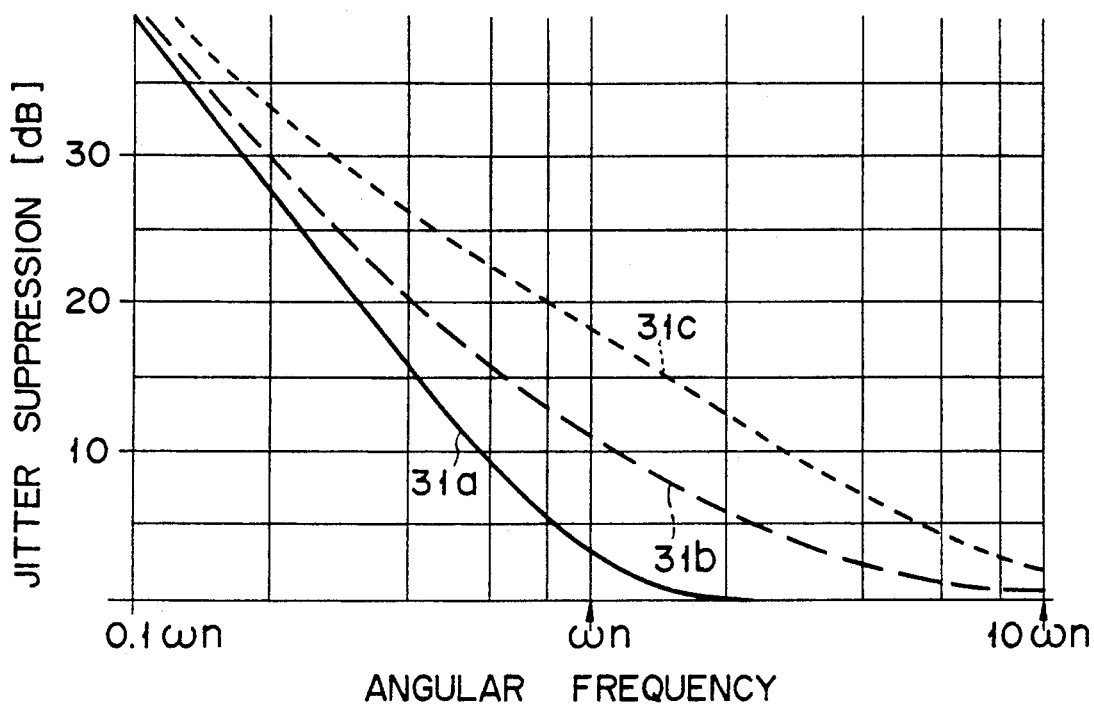
FIG. 11 is a graph showing an experimental result indicating jitter suppression characteristics obtained in the above embodiment.

FIG. 11 shows jitter suppression characteristics obtained from equation (18) by using the above-mentioned angular frequency conditions, provided that the damping coefficient of the PLL alone is represented by $\zeta = 0.707$. Referring to FIG. 11, a curve 31a represents the characteristic of the PLL alone, and curves 31b and 31c respectively represent suppression characteristics obtained when the PLL and the injection-synchronized loop are used together with the injection efficiency $\eta = \frac{1}{2}$ and $= 0.875$. The curve 31c will be described in detail in the next embodiment.

Figure 12:
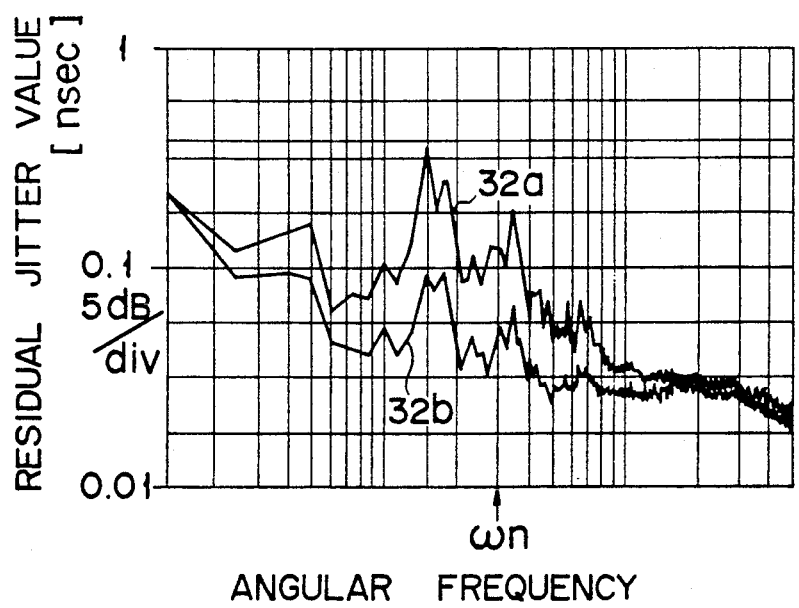
FIG. 12 is a graph showing a measurement result of residual jitter spectra obtained in the above embodiment.

FIG. 12 shows a sample of measurement of residual jitter spectra obtained by an experiment conducted by the present inventors. Referring to FIG. 12, a curve 32a represents the residual jitter spectrum characteristic of the PLL alone; and a curve 32b, a residual jitter spectrum characteristic obtained when the PLL and the injection-synchronized loop are used together with the injection efficiency $\eta = \frac{1}{2}$. It is apparent from FIGS. 11 and 12 that high-frequency jitter near the natural angular frequency $\omega n$ is greatly improved.

Although the noise bandwidth of the loop is increased to 1.8 times that of the PLL alone, no increase in noise jitter is recognized, as shown in FIG. 12. In addition, the jitter amount is negligibly small. The amount of high-frequency jitter caused by vibrations and the like of a mechanical portion of the optical disk apparatus rather poses a problem. It is an object of the present invention to suppress this high-frequency jitter. The response characteristics are mostly determined by the response characteristics of the injection-synchronized loop and are greatly improved.

According to the above-described embodiment, in addition to the normal PLL for obtaining the reference clock signal Pck on the basis of the clock pit pulse signal Pin reproduced from a rotating optical disk, the injection-synchronized loop is employed, in which after phase comparison or phase detection by means of the PLL is completed, the injection pulse signal Pi is generated on the basis of a clock pit pulse signal processed by time-domain filtering, and the phase of the reference clock signal Pck is controlled by supplying the signal Pi to the injection-synchronized VCO 27. With such an arrangement, occurrence of high-frequency jitter of the reference clock signal Pck can be successfully prevented or inhibited without sacrificing the data storage capacity of an optical disk and without degrading the noise resistant characteristics of the optical disk apparatus. Therefore, in addition to an improvement in operation stability and performance achieved by the PLL, a high-precision reference clock signal especially required to increase the data transfer speed and retrieval speed of the optical disk apparatus can be generated.

A reference clock generation circuit unit for an optical disk apparatus according to another embodiment of the present invention is generally designated by reference numeral 20' in FIG. 13. The same reference numerals in the illustration of this embodiment denote the same parts as in the embodiment described above with reference to FIG. 1, and a detailed description thereof will be omitted to simply prevent redundancy of the description.

The reference clock generation circuit unit 20' is characterized in that the jitter suppression function is further improved. This embodiment is based on the assumption that a plurality of clock pulses are detected per sampling operation, i.e., within a certain servo byte. For this reason, two gates 32a and 23b are arranged.

A clock pit detector 22 generates two types of gate pulse signals Pg1 and Pg2. The first gate pulse Pg1 is used to extract the start clock pit pulse of a string of clocks. This gate pulse signal Pg1 is supplied to a gate 23a. The second gate pulse signal Pg2 is supplied to the other gate 23b to extract all the clock pulses.

The start clock pit pulse extracted by the first gate 23a is supplied to a PLL constituted by a phase-comparator 24, a switch 25, a low-pass filter 26, an injection-synchronized VCO 27, a frequency-dividing counter 28, and a decoder 29. Clock pulses Pin extracted by the gate 23b are subjected to time-domain filtering in a time-domain filter 30 in the same manner as described in the above embodiment. Thereafter, the clock pit pulses Pin are supplied to an injection pulse generator 31.

The injection pulse generator 31 generates a single or a plurality of injection pulse signals Pi. When these injection pulse signals Pi are injected into the injection-synchronized VCO 27, an injection-synchronized loop is realized. It should be noted in this embodiment that the decoder 29 in the injection-synchronized loop generates a gate pulse signal Pm used for time-domain filtering, which is then supplied to the time-domain filter 30.

Figure 14:
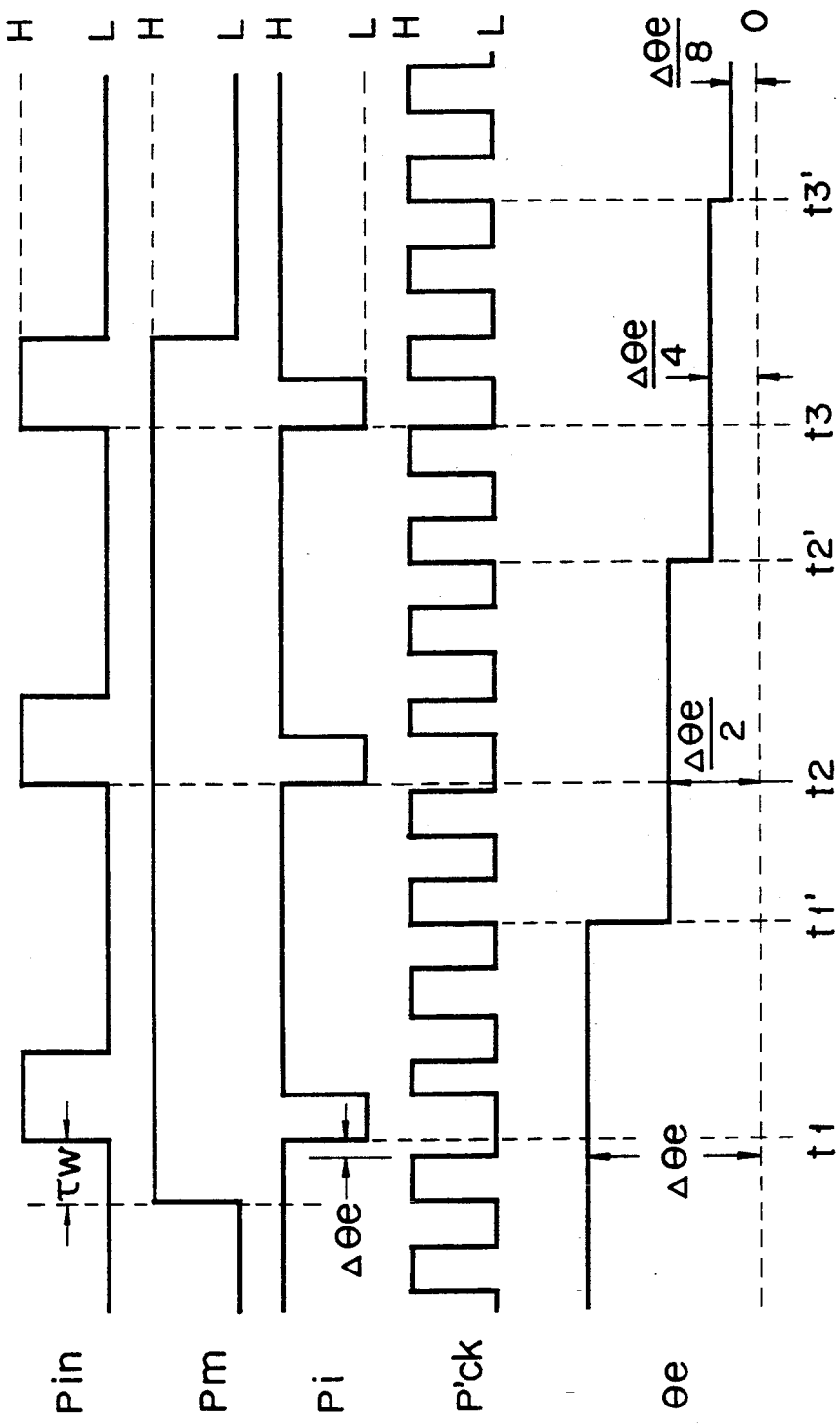
FIG. 14 is a timing chart showing the waveforms of main electrical signals generated at the respective main components of the circuit portion in FIG. 13 on the same time scale.

An injection operation will be described in detail below with reference to a timing chart shown in FIG. 14. In this case, three injection pulses Pi will be considered.

Assume that the reference clock pck and the gate pulse Pm have the same rise timing. Assume also, as described with reference to the first embodiment, that the average rise timing of the clock pit pulse Pin is adjusted by the PLL to be delayed from the rise timing of the gate pulse Pm by a time $\tau w$. Furthermore, in order to continuously perform injection operations, the natural angular frequency $\omega n$ of the injection-synchronized VCO 27 is set to be equal to ωc, and the damping coefficient ζ is set to be 0.8.

If the reference clock Pck is advanced from the injection pulse Pi by $\Delta\theta e$ at a timing t1, injection control of the reference clock Pck is performed in a direction to be delayed at the rise timing of the injection pulse Pi. As described above, the phase difference $\theta e$ between the injection pulse Pi and the reference clock Pck at the timing t1 is given by $\theta e = \Delta\theta e/2$. Since the phase difference $\theta e = \Delta\theta e/2$ at a timing t2, injection control of the reference clock Pck is further performed in a direction to be delayed at the rise timing of the injection pulse Pi. The phase difference at the timing t2 is further improved, and $\theta e = \Delta\theta e/4$. At a timing t3, injection control is performed in the same direction. The phase difference at the timing t3 is eventually set to be $\theta e = \Delta\theta e/8$, thus obtaining the injection efficiency $\eta = 0.875$.

If an injection efficiency equivalent to that obtained in this embodiment is to be obtained by injection of one injection pulse, a problem may be posed in terms of noise resistant characteristics. If, however, injection control is performed by using a plurality of injection pulses in this manner, a large injection efficiency can be obtained without degrading the noise resistant characteristics. A jitter suppression characteristic with the injection efficiency $\eta = 0.875$ is represented by a curve 31c in FIG. 11. In this case, the suppression amount of the PLL at the natural angular frequency n is as large as 18 dB. That is, high-frequency jitter is more effectively suppressed.

In this case, the clock pit pulse Pin has a predetermined period. However, since an injection efficiency is determined by the number of injection pulses per sampling operation, and any reproduction pulse which satisfies the injection conditions can be used, the clock pit pulse Pin need not have a predetermined period. In addition, the number of pulses may vary. This means that the injection efficiency can be improved by using control signals and the like other than servo bytes. In other words, a PLL requires a predetermined sampling period, and suppression of high-frequency jitter requires a high sampling frequency, i.e., sacrifice of the storage capacity of an optical disk. In contrast to this, if an injection-synchronized loop is used together with a PLL as in the present invention, high-frequency jitter can be suppressed without sacrificing the storage capacity. In addition, as in this embodiment, timing data of pits other than clock pits can be used for phase control by means of the injection-synchronized loop, and the high-frequency jitter suppression characteristics can be further improved.

The principle of PLL control by means of the PLL/injection-synchronized loop of the present invention described above can be successfully applied to an optical disk apparatus of a sector format type. This optical disk is formatted to define tracks spirally or concentrically arranged on one surface and radially divided sectors. Each sector area has a control information area called a "preformat area" arranged at its head portion, and a free area for data storage with a gap sandwiched therebetween. Typically, each preformat area includes a sector mark signal SM, sector address data ID, and a PLL control signal (preamble pulse signal) VF for properly synchronizing a recording/reproduction reference clock signal with the generation timing of record data. Such a sample-servo format scheme of an optical disk itself is well known to a person skilled in the art.

As shown in FIG. 15, a reference clock generation circuit unit for a sector format type optical disk apparatus is generally designated by reference numeral 200. A binary processing circuit 201 is arranged to receive an electrical reproduction signal Sr read by scanning a rotating optical disk with a laser beam. The binary processing circuit 201 generates a binary pulse signal Pin. The binary pulse signal Pin well reflects the storage information in the preformat area of each sector area. This pulse signal Pin is supplied to a phase-comparator 202.

The phase-comparator 202 constitutes a PLL together with a low-pass filter 203 and a VCO 204. This PLL includes a feed-back pulse generator 205. The feed-back pulse generator 205 generates a feed-back pulse signal Pfb and an interpolation pulse signal Pc by frequency-dividing a reference clock signal Pck. The binary pulse signal Pin is supplied to the first input of the phase-comparator 202. The feed-back signal Pfb is supplied to the second input of the phase-comparator 202. The phase-comparator 202 compares these input signals and detects a phase difference therebetween. A comparison result signal from the phase-comparator 202 is sent as a control voltage Vc to the VCO 204 through the LPF 203. An oscillation output signal from the VCO 204 appears as the reference clock signal Pck at an output terminal 206 of the unit 200.

In addition to the above-described PLL, an injection-synchronized loop including a time-base filter 207 and an injection pulse generator 208 is provided to the VCO 204. The VCO 204 is of an injection-synchronized type. The time-base filter 207 receives the binary pulse signal Pin and the feed-back pulse signal Pfb. In addition, the time-base filter 207 is applied with the reference clock Pck from the injection-synchronized VCO 204. The time-base filter 207 generates window pulses by referring to the binary pulse signal Pin and the feed-back pulse signal Pfb. These window pulses have different pulse widths during a preamble input period and a reproduction data pulse input period. The time-base filter 207 performs time-domain filtering for a PLL lock preamble pulse signal and subsequent reproduction data pulses by using these window pulses.

The injection pulse generator 208 is responsive to the time-base filter 207 and intermittently or periodically generates a plurality of negative injection pulses every time phase comparison of sequential sector addresses selected for data access is completed by the phase-comparator 202. These injection pulse signals Pi are continuously injected into the injection-synchronized VCO 204 to realize a continuous injection-synchronized loop. With such an arrangement, even at the time of high-speed data access of the sector-formatted optical disk, a high-precision reference clock signal free from high-frequency jitter can be generated.

Figure 16:
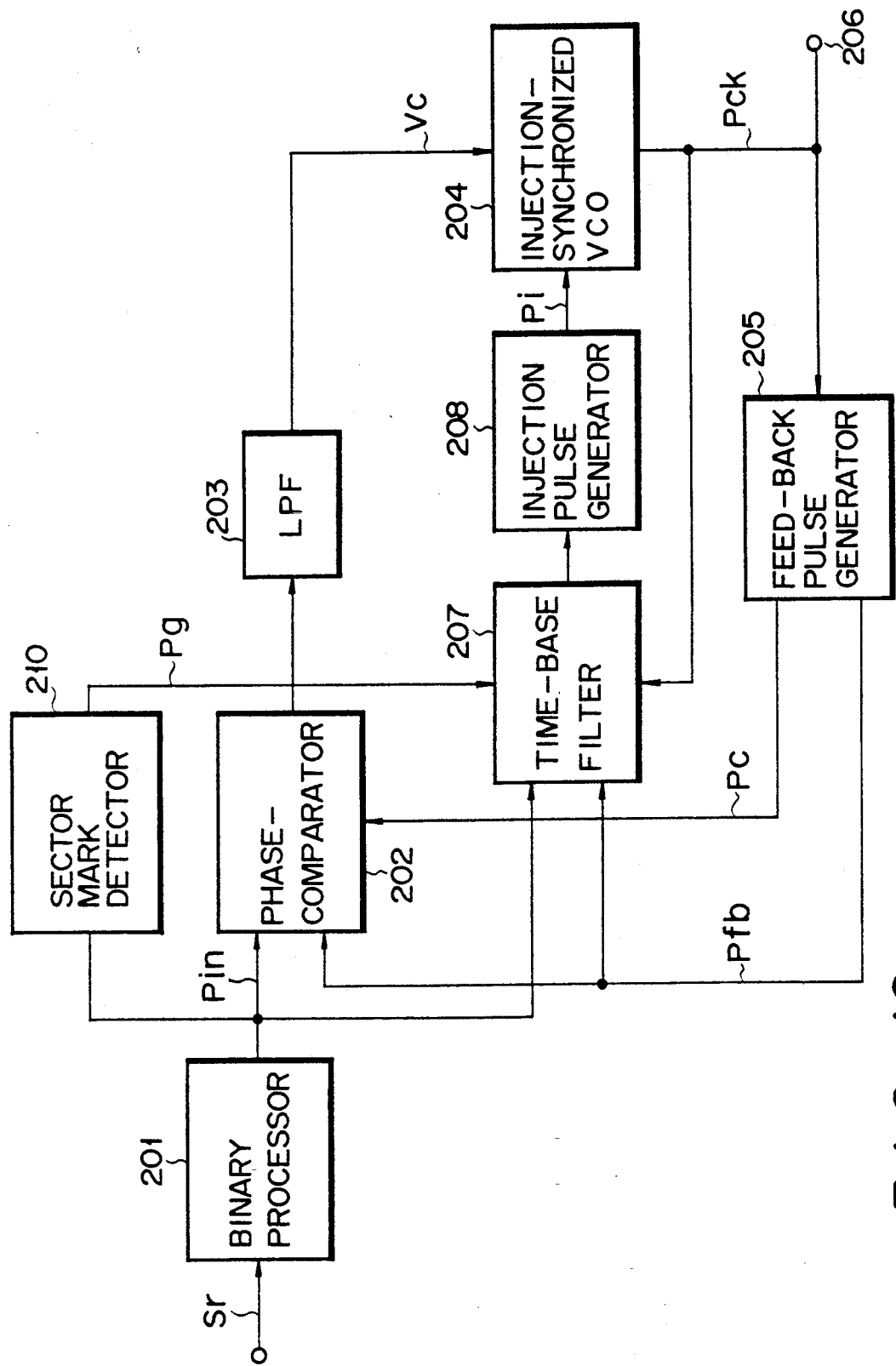
FIG. 16 is a schematic diagram showing a modification of the reference clock signal generation circuit in FIG. 15.

The reference clock generation circuit 200 may be modified, as shown in FIG. 16, wherein a sector mark detector 210 is additionally arranged. The sector mark detector 210 receives the binary pulse signal Pin and detects a sector mark data component therefrom. A detection output signal from the sector mark detector 210 is called a preamble gate signal Pg. The preamble gate signal Pg is supplied to the time-base filter 207. The amplification factor and filtering time constant of the time-base filter 207 are variably controlled. With such an arrangement, a high-precision reference clock signal free from high-frequency jitter for the sector format type optical disk apparatus can be generated.

Having described the invention as related to the specific embodiments directed to the optical disk apparatus, it is to be understood that the present invention may also be applied to a magnetic disk apparatus without departing from the spirit and the scope of th invention as hereinafter claimed.

What is claimed is

1. A device for generating a reference clock signal having a predetermined frequency by using clock information reproduced from a data storage medium, comprising:

signal extraction means for receiving an electrical reproduction output signal of the medium and for generating an electrical pulse signal reflecting the clock information;

oscillator means for variably oscillating so as to generate an electrical oscillation pulse signal serving as the reference clock signal;

comparator means, connected to said signal extraction means and said oscillator means, for detecting a phase difference between the pulse signal and the oscillation pulse signal, and for generating an electrical comparison result signal in response to which said oscillator means variably oscillates; and injection-synchronized controller means, which receives the pulse signal and is responsive to the oscillation pulse signal, for injecting an intermittent pulse component having a selected pulse width into said oscillator means after phase comparison is perform by said comparator means, said oscillator means including an injection-synchronized voltage-controlled oscillator, responsive to the pulse component, for adjusting a phase of the oscillation pulse signal.

2. The device according to claim 1, wherein the intermittent pulse component has a pulse width substantially equal to a non-response period of oscillation of said injection-synchronized voltage-controlled oscillator.

3. The device according to claim 2, wherein said injection-synchronized controller means comprises:

time-base filter means for receiving a feed-back signal of the oscillation pulse signal from said injection-synchronized voltage-controlled oscillator, and for extracting a pulse component/pulse components synchronized with the feed-back signal from the pulse signal; and injection pulse generator means, connected to said time-base filter means, for defining the intermittent pulse component on the basis of the pulse component/pulse components extracted by said time-base filter means, and for supplying the defined pulse component to said injection-synchronized voltage-controlled oscillator.

4. The device according to claim 3, wherein said injection pulse generator means supplies one intermittent pulse component to said injection-synchronized voltage-controlled oscillator after phase comparison is performed by said comparator means.

5. The device according to claim 3, wherein said injection pulse generator means supplies a plurality of intermittent pulse components to said injection-synchronized voltage-controlled oscillator after phase comparison is performed by said comparator means.

6. The device according to claim 3, wherein said comparator means comprises a phase-comparator for comparing the pulse signal with the feed-back signal.

7. The device according to claim 3, further comprising frequency-dividing counter means, connected to said injection-synchronized voltage-controlled oscillator and said comparator means, for receiving the oscillation pulse signal and for generating the feed-back signal by frequency-dividing the oscillation pulse signal.

8. A phase-lock control circuit for a information-recording/reproduction system using a rotatable optical disk, comprising:

(a) detector means for receiving an electrical reproduction signal read from the optical disk, for detecting a peak component corresponding to servo-controlling pits formed in the optical disk in advance, and for generating an extracted clock pit pulse signal;

(b) oscillator means for electrically oscillating in response to the extracted clock pit pulse signal so as to generate a reference clock signal;

(c) a first phase-lock control loop arranged for said oscillator means, said first loop comprising, signal feed-back means, connected to said oscillator means, for generating a feed-back pulse signal by frequency-dividing the reference clock signal, and comparator means, having first and second inputs for respectively receiving the clock pit pulse signal and the feed-back pulse signal, for comparing these signals to generate an electrical comparison signal representing a phase difference therebetween, said oscillator means changing an oscillation state in response to the comparison signal so as to compensate for the phase difference; and (d) a second phase-lock control loop arranged for said oscillator means, said second loop comprising injection-synchronized controller means for receiving the clock pit pulse signal, the feed-back pulse signal, and the reference clock signal output from said oscillator means, generating at least one injection pulse having a pulse width substantially equal to a non-response period of said comparator means in response to the reference clock signal upon completion of a comparison operation by said comparator means, and for supplying the injection pulse to said oscillator means, said oscillator means including an injection-synchronized voltage-controlled oscillator, responsive to the pulse component, for adjusting a phase of the oscillation pulse signal.

9. The circuit according to claim 8, wherein said injection-synchronized controller means comprises:

time-base filter means for executing time-domain filtering to extract a pulse component/pulse components synchronized with the feed-back signal from the clock pit pulse signal; and injection pulse generator means, connected to said time-base filter means, for generating the injection pulse on the basis of a pulse component extracted by said time-base filter means, and for injecting the injection pulse into said injection-synchronized voltage-controlled oscillator.

10. The circuit according to claim 8, wherein said injection-synchronized controller means comprises:

a tapped delay circuit responsive to the reference clock signal;

gate means for generating a window pulse signal for extracting a rise timing of the clock pit pulse signal in response to an output signal of said delay circuit and the feed-back pulse signal; and a flip-flop of a selected type, responsive to the clock pit pulse signal and the window pulse signal, for supplying an output signal therefrom as the injection pulse to said injection-synchronous voltage-controlled oscillator.

11. The circuit according to claim 10, wherein said injection-synchronized controller means further comprises a delay circuit, associated with said flip-flop, for delaying the output signal from said flip-flop and feeding back the signal to said flip-flop.

12. The circuit according to claim 11, wherein said injection-synchronized voltage-controlled oscillator comprises:
a NAND gate for receiving the injection pulse;
a load resonator associated with said NAND gate; and
an inverter, having an input and an output respectively connected to said NAND gate and said tapped delay circuit, for supplying an output signal therefrom as the reference clock signal to said delay circuit.

* * * * *